US005227827A

United States Patent [19]

Murakami

[11] Patent Number: 5,227,827

[45] Date of Patent: Jul. 13, 1993

[54] APPARATUS FOR AND METHOD OF SPLICING PHOTOGRAPHIC FILMS

[75] Inventor: Hiroshi Murakami, Kanagawa, Japan

[73] Assignee: Fuji Photo Film Co., Ltd., Kanagawa, Japan

[21] Appl. No.: 966,408

[22] Filed: Oct. 26, 1992

[30] Foreign Application Priority Data

Oct. 30, 1991 [JP] Japan ................................ 3-284896

[51] Int. Cl.[5] ............................................ G03B 13/02

[52] U.S. Cl. .................................... 354/333; 354/354

[58] Field of Search ........................ 354/297, 333, 319; 355/40, 41, 77

[56] References Cited

U.S. PATENT DOCUMENTS 4,293,215 10/1981 Rosborough, Jr. et al. ......... 355/40
4,933,711 6/1990 Gudmundson et al. .............. 355/40
5,159,385 10/1992 Imamura .......................... 355/40 X

FOREIGN PATENT DOCUMENTS 58-25262 5/1983 Japan .
1-55448 11/1989 Japan .

*Primary Examiner*—D. Rutledge

*Attorney, Agent, or Firm*—Sughrue, Mion, Zinn, Macpeak & Seas

[57] ABSTRACT

A film splicing apparatus for sorting a plurality of photographic films according to a user's ordering instructions which have been recorded on an envelope or the photographic films and for splicing the sorted photographic films so as to form them into a shape of a roll. A photographic film, which has been pulled from a film cartridge, is conveyed along a predetermined conveying path. The leading end of the photographic film is placed in a standby state at a splicing position. On the other hand, the user's ordering instructions are read and a magazine corresponding to the read ordering instructions is selected. The rear end of a roll of photographic film, which has already been accommodated in the magazine, is conveyed to the splicing position. The leading end of the photographic film, which has been placed in the standby state at the splicing position, is spliced to the rear end of the roll of photographic film. A photographic film sorting process and a film splicing process can be automatically carried out. It is therefore unnecessary for an operator to manually sort the photographic films and hence the efficiency of work can be improved.

20 Claims, 9 Drawing Sheets

FIG. 5

FRACTIONAL INFORMATION TABLE

| SIZE | KIND OF SURFACE | TYPE OF FILM | ROLL NUMBER |
|---|---|---|---|
| E | GLOSSY | COLOR NEGA | 1 |
| EC | GLOSSY | COLOR NEGA | 2 |
| ES | SILKY MESH | COLOR NEGA | 3 |

APPARATUS FOR AND METHOD OF SPLICING PHOTOGRAPHIC FILMS

BACKGROUND OF THE INVENTION

1. Field of the Invention

The present invention relates to an apparatus for and a method of splicing exposed photographic films so as to shape the spliced photographic films in the form of rolls.

2. Description of the Related Art

Negative films, which a user desires to develop, have heretofore been sorted according to user's ordering instructions. The ordering instructions include frame size, enlargement size, the kind of surface of printing paper, etc.

The sorted photographic films are respectively spliced and loaded into a film processor and a printer in the form of rolls. Thus, the film processor can continuously develop the photographic films. Further, since the photographic films have been sorted according to the ordering instructions, the printer can also print successively the photographic films under the same conditions without effecting processes such as a change in position of a mask of a negative carrier, a change in enlargement size and a change in printing paper or the like.

However, an operation for sorting the photographic films according to the ordering instructions is manually carried out while an operator is looking at the ordering instructions described in an order column of each envelope. Therefore, a great deal of labor and time are required.

That is, an operation for winding each negative film in the form of a roll is automatically performed. Since, however, a sorting operation is required during a step prior to the winding process, the efficiency of work is reduced.

As a reference technique, a proposal has been made which compares photographing frame sizes of front-to-rear portions as seen from a spliced portion of negative films after the negative films have been first spliced together at random before development, cut the combined photographic film if the frame sizes do not coincide with each other and then resplice the photographic films.

It has also been proposed that envelopes, which have been arranged in order of respective negative films spliced at random, are rearranged based on ordering instructions employed upon the sorting of the negative films so as to be the same as the order of the respliced respective negative films (see Japanese Patent Application Publication Nos. 58-25262 and 1-55448).

SUMMARY OF THE INVENTION

With the foregoing in view, it is an object of the present invention to provide a film splicing apparatus capable of reducing working time by reducing the number of operation steps and manual operation by an operator, and splicing respective photographic films in a state in which they have been reliably sorted according to ordering instructions.

According to a first aspect of the present invention, there is provided a film splicing apparatus for sorting a plurality of photographic films by ordering instructions of customers and for splicing the sorted photographic films together, comprising a plurality of magazines for accommodating first photographic films therein according to the respective ordering instructions, the first photographic films each being a single photographic film or a plurality of spliced photographic films, first conveying means for pulling a second exposed photographic film from a film cartridge so as to convey the same along a predetermined conveying path, reading means for reading ordering instructions of the second photographic film, selecting means for selecting a magazine corresponding to the ordering instructions which have been read by the reading means, second conveying means for guiding and conveying the outermost peripheral winding rear end of a first photographic film accommodated in the selected magazine toward the predetermined conveying path, splicing means for splicing together the leading end of the second photographic film placed in the conveying path and the rear end of the first photographic film, and winding means for winding the first photographic film joined to the second photographic film by the splicing means into the magazine.

According to the film splicing apparatus of the present invention, the second photographic film which has been drawn from the film cartridge, is conveyed along the predetermined conveying path by the first conveying means. The leading end of the second photographic film is placed in a standby state at a position where the leading end thereof is joined to the rear end of the first photographic film by the splicing means.

On the other hand, the ordering instructions (such as the frame size employed in the photography of a camera, enlargement size at the time of printing and the kind of surface of printing paper at the time of printing) of the second photographic film are read by the reading means. The magazine corresponding to the ordering instructions thus read is selected.

The outermost peripheral winding rear end of the first photographic film accommodated in the selected magazine is guided toward the given conveying path from the magazine by the second conveying means and positioned at the splicing location so as to correspond to the leading end of the second photographic film.

The splicing means splices the leading end of the second photographic film and the rear end of the first photographic film. Thereafter, the winding means winds the combined photographic film into the magazine.

Thus, the magazine is selected for each photographic film and the winding rear end of a photographic film accommodated in the selected magazine is pulled out so as to be joined to the leading end of the corresponding photographic film. Therefore, a photographic film sorting process and a film splicing process can be automatically carried out, thereby making it possible to improve the efficiency of work.

Further, the film splicing apparatus of the present invention may include envelope sorting means for sorting envelopes according to the ordering instructions which have been read by the reading means. At this time, and similar to the photographic films, the envelopes having the photographic films accommodated therein can also be rearranged so as to correspond to the photographic films accommodated in the magazines according to the respective ordering instructions. Therefore, the photographic films can be associated with the envelopes and hence an envelope returning process can also be simplified.

The ordering instructions to be read by the reading means may be recorded as code information in an order column described on the envelope. Alternatively, the ordering instructions may be recorded on each photographic film as optical or magnetic means. When the respective ordering instructions are recorded on the envelopes, a process for sorting the envelopes becomes easy. It is also possible to sort the envelopes at other place, e.g., in the final process at a photofinisher.

According to a second aspect of the present invention, there is provided a film splicing apparatus for sorting a plurality of photographic films by ordering instructions and splicing the sorted photographic films together, comprising a plurality of magazines for accommodating first photographic films therein according to the respective ordering instructions, the first photographic films each being a single photographic film or a plurality of spliced photographic films, first conveying means for pulling a second exposed photographic film from a film cartridge so as to convey the same along a predetermined conveying path, stopping means for detecting the leading end of the second photographic film and for stopping the same at a splicing position, reading means for reading ordering instructions relative to the second photographic film, selecting means for selecting a magazine corresponding to the ordering instructions which have been read by the reading means, determining means for determining whether or not the outermost peripheral winding rear end of a first photographic film accommodated in the selected magazine is located at the splicing position, second conveying means for guiding and conveying the outermost peripheral winding rear end of the first photographic film accommodated in the selected magazine toward the splicing position, splicing means for splicing together the leading end of the second photographic film and the rear end of the first photographic film at the splicing position, and winding and accommodating means for winding and accommodating the first photographic film joined to the second photographic film by the splicing means in the magazine, third conveying means for conveying envelopes for delivering photographic films between each user and a photofinisher, sorting means for sorting the envelopes according to the ordering instructions which have been read by the reading means, and a plurality of stackers for accommodating therein the envelopes sorted by the sorting means, the stackers being identical in number to the magazines.

Further, according to a third aspect of the present invention, there is provided a method of sorting a plurality of photographic films by ordering instructions of customers and splicing the sorted photographic films together, the method comprising the following steps: a step (a) for reading ordering instructions relative to a second photographic film, a step (b) for selecting a magazine for accommodating the second photographic film therein based on the ordering instructions read in the step (a), conveying the outermost peripheral winding rear end of a first photographic film which has been accommodated in the selected magazine, to a splicing position, and conveying the leading end of the second photographic film to the splicing position, the first photographic film being a single photographic film or a plurality of spliced photographic films, and a step (c) for splicing together the leading end of the second photographic film and the rear end of the first photographic film at the splicing positions.

The method may further include, after the step (c), a step (d) for accommodating the first photographic film joined to the second photographic film within the magazine. Furthermore, the method may also include, after the step (a), a step (e) for sorting envelopes for delivering photographic films between each user and a photofinisher according to the ordering instructions which have been read in the step (a).

As described above, the film splicing apparatus according to the present invention can bring about excellent effects in that operation time can be reduced by reducing the number of operation steps and by removing the manual operation of an operator. Another advantage is that respective photographic films can be spliced in a state in which the photographic films have been reliably sorted according to ordering instructions.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 5 is a view showing a sorting information table stored in the control device;

DETAILED DESCRIPTION OF THE PREFERRED EMBODIMENTS

Figure 1:
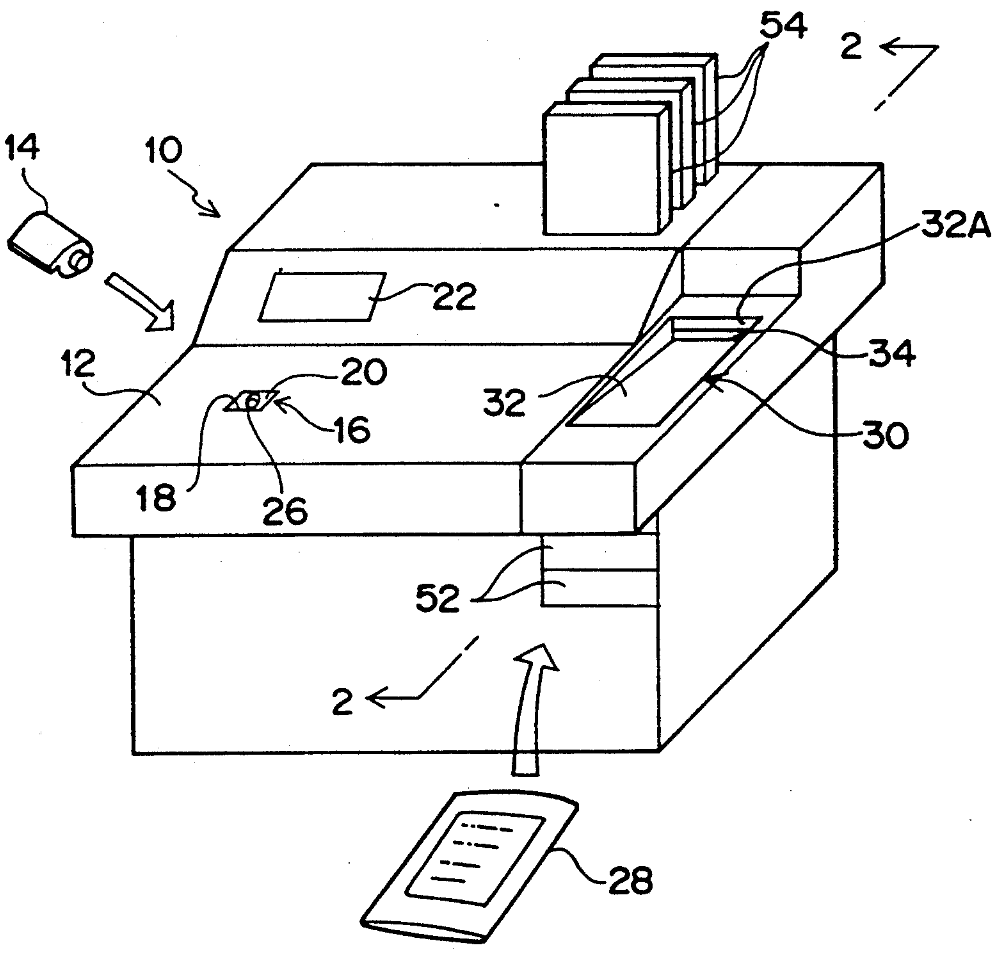
FIG. 1 is a perspective view showing an external appearance of a film splicing apparatus according to one embodiment of the present invention.

FIG. 1 shows a film splicing apparatus 10 according to one embodiment of the present invention. A loading portion 16 for loading a film cartridge 14 into the film splicing apparatus 10 is mounted on a main table 12 of the film splicing apparatus 10. The loading portion 16 is comprised of a rectangular hole 18 defined in the main table 12 and a cover 20 which is mounted to the hole 18 in order to close the hole.

Figure 4:
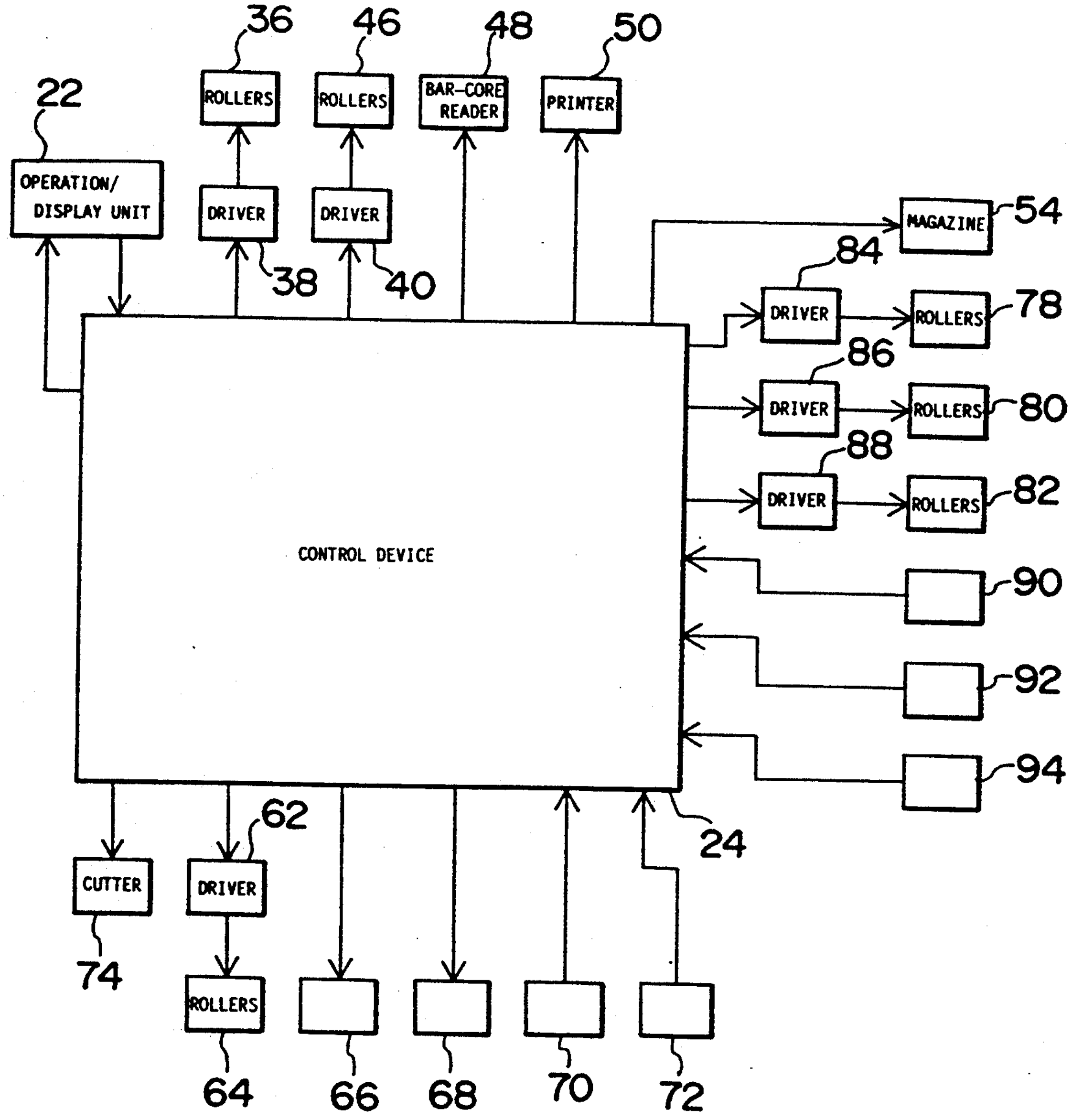
FIG. 4 is a block diagram showing a control device and peripheral devices of the film splicing apparatus shown in FIG. 1.

An operation/display unit 22 is mounted on a continuous slanted surface formed to the rear of the main table 12. The unit 22 is electrically connected to a control device 24 (see FIG. 4).

The cover 20 has a concave portion 26 defined therein so as to accommodate a part of the film cartridge 14. An operator puts the film cartridge 14 into the corresponding concave portion 26.

The cover 20 is constructed so as to turn inwardly at the film splicing apparatus 10 about one side thereof. When the hole 18 is opened, the cover 20 acts as a slanted surface so as to slide the film cartridge 14 toward the inside of the film splicing apparatus 10.

An envelope loading port 30 for loading an envelope 28 is formed on the right side of the main table 12 as seen in FIG. 1. The envelope loading port 30 has a rectangular groove 32 corresponding to the outline of the envelope 28. A slit 34, serving as an insertion slot for the envelope 28, is defined in a vertically-extending end wall 32A of the groove 32 as seen in the inward direction of the film splicing apparatus 10. A pair of rollers 36 (see FIG. 2) is disposed at a position which is adjacent to the slit 34 and lies inside the film splicing apparatus 10. The envelope 28 is interposed between the rollers 36 and conveyed toward the inside of the film splicing apparatus 10. The pair of rollers 36 is connected to the control device 24 (see FIG. 4) through a driver 38 and rotated in accordance with a signal output from the control device 24.

Figure 2:
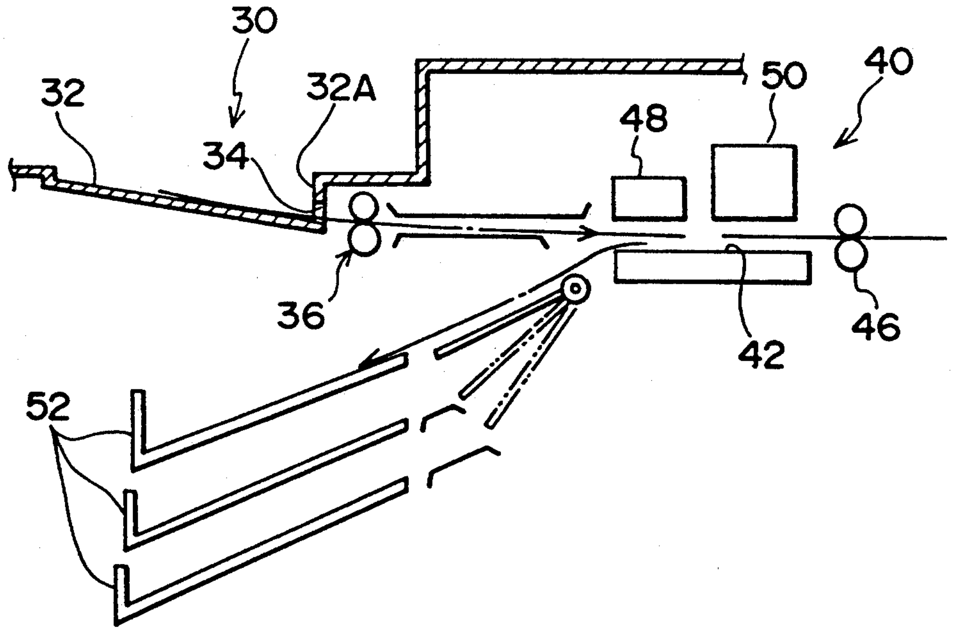
FIG. 2 is a schematic view showing the structure of an envelope reader/printer unit.

As shown in FIG. 2, an envelope reader/printer unit 40, which is connected to the control device 24, is provided on the downstream side as seen in the direction in which the envelope 28 is conveyed.

As illustrated in FIG. 2, a stage 42 for conveying the envelope 28 is disposed in the envelope reader/printer unit 40 so that the envelope 28 which has been interposed between the pair of rollers 36, is conveyed along the upper surface of the stage 42. A pair of rollers 46, which has been connected to the control device 24 via a driver 40, is provided on the downstream side of the stage 42 so as to be halted in a state where the envelope 28 is interposed therebetween.

A bar-code reader 48 is disposed above the stage 42. Further, the bar-code reader 48 reads a bar code which has been recorded in an order column of the envelope 28, and outputs the read information to the control device 24.

The bar code represents ordering instructions such as enlargement size, the kind of surface of printing paper, etc.

In addition, a printer 50 is provided on the downstream side of the bar-code reader 48. The printer 50 can move along the transverse direction of the envelope 28 so as to print predetermined information on the envelope 28 which has been stopped at the stage 42. The printer 50 is driven by the control device 24.

The envelope 28, which has been subjected to a predetermined process in the envelope reader/printer unit 40, is conveyed by the reverse rotation of the pair of rollers 46 so as to be guided toward a position below the envelope loading port 30.

A plurality of envelope stackers 52 are disposed below the envelope loading port 30. The envelope stackers 52 correspond to the number (three in the present embodiment) of negative-film magazines 54 (see FIGS. 1 and 3) which will be described later. The envelope 28 is selectively accommodated into a predetermined stacker according to the contents ordered.

Figure 3:
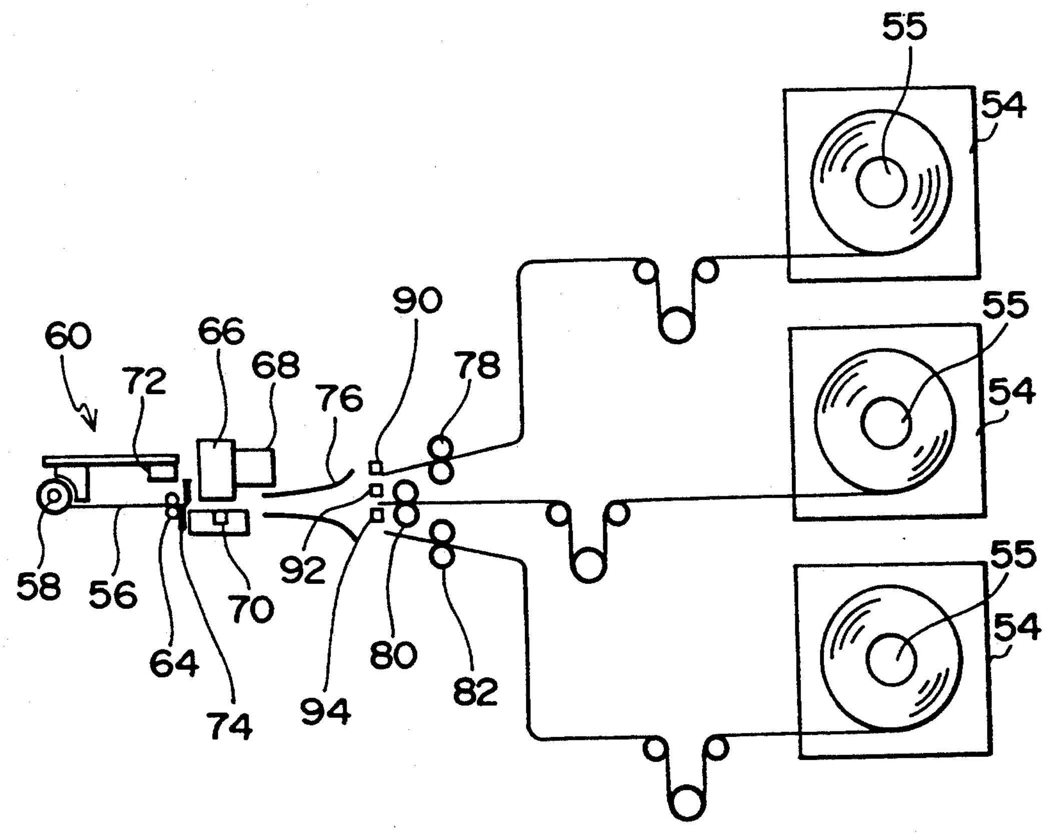
FIG. 3 is a schematic view illustrating the structure of a negative-film splicing mechanism.

The three magazines 54 are provided on a raised portion located to the rear of the main table 12 of the film splicing apparatus 10. As shown in FIG. 3, each of the magazines 54 has a reel 55, which is rotated in accordance with a signal generated from the control device 24. A negative film 56 is wound onto the reel 55 in each magazine 54 in the form of a roll. The rolls of negative films 56 are respectively classified and sorted according to ordering instructions. The film cartridge 14, which has been inserted from the loading portion 16, is positioned within a film delivering unit 60.

A pair of rollers 64, which are electrically connected to the control device 24 via a driver 62, is provided on the downstream side of the film delivering unit 60. The rollers 64 interpose the outermost peripheral leading end of the negative film 56 wound onto a spool 58 therebetween and feed it in a desired direction. A splicing head 66 is provided on the downstream side of the pair of rollers 64 and above the film conveying path. The splicing head 66 is electrically connected to the control device 24 and moves toward the conveying path in accordance with a signal outputted from the control device 24.

A splice tape supplier 68 is coupled to the splicing head 66. The splice tape supplier 68 serves to supply a piece of splice tape having an ID number printed thereon to the splicing head 66. Thus, when the splicing head 66 is activated (when the negative film 56 is moved toward the conveying path), the desired piece of splice tape with an ID number marked thereon is applied to the negative film 56.

A negative-film leading end sensor 70 is disposed below the conveying path in a facing relationship to the splicing head 66 so as to detect the leading end of the negative film 56 conveyed by the pair of rollers 64.

The control device 24 serves to stop the delivery of the negative film 56 and place the negative film 56 in a standby state in response to a signal supplied from the negative-film leading end sensor 70.

A negative-film rear end sensor 72 is disposed between the film delivering unit 60 and the pair of rollers 64 so as to be located above the conveying path. When the rear end of the negative film 56 is detected by the negative-film rear end sensor 72, the control device 24 operates a cutter 74 disposed in a position adjacent to the downstream side of the pair of rollers 64 and cuts the negative film 56.

A pair of guide plates 76 whose interval dimensions are gradually increased (represented in the form of a so-called unfolded fan) is provided on the downstream side of the splicing head 66. Three pairs of rollers 78, 80, 82 are disposed in facing relationship to the broadest leading ends of the guide plates 76 along the upper and lower directions.

The rear ends of the negative films 56, which are pulled from the three magazines 54 and as seen from the negative-film winding direction, are interposed between the respective pairs of rollers 78, 80, 82.

The three pairs of rollers 78, 80, 82 are electrically connected to the control device 24 via respective drivers 84, 86, 88 and rotated in accordance with signals outputted from the control device 24.

Standby position sensors 90, 92, 94 are provided between the pair of guide plates 76 and the respective rollers 78, 80, 82. The negative films 56, which are being pulled from the corresponding magazines 54, are stopped and placed in standby states at positions detected by the respective standby position sensors 90, 92, 94.

Here, the control device 24 selects a corresponding magazine 54 in accordance with the ordering instructions, which have been read from the envelope 28, and activates a desired roller pair (any one of rollers 78, 80, 82) corresponding to the selected magazine 54 to guide the rear end of the photographic film 56 as seen from the negative-film winding direction toward the pair of guide plates 76 so as to be fed to the splicing head 66. As a result, the rear end of the photographic film 56 meets in an end-to-end relationship with a single negative film 56 which has been placed in a standby state at the position detected by the negative-film leading end sensor 70, thereby making it possible for the splicing head 66 to join or splice together the leading end of the single negative film 56 and the rear end of the rolled negative film 56.

The operation of the present embodiment will now be described below in accordance with flowcharts shown in FIGS. 6A to 6C.

Figure 6A:
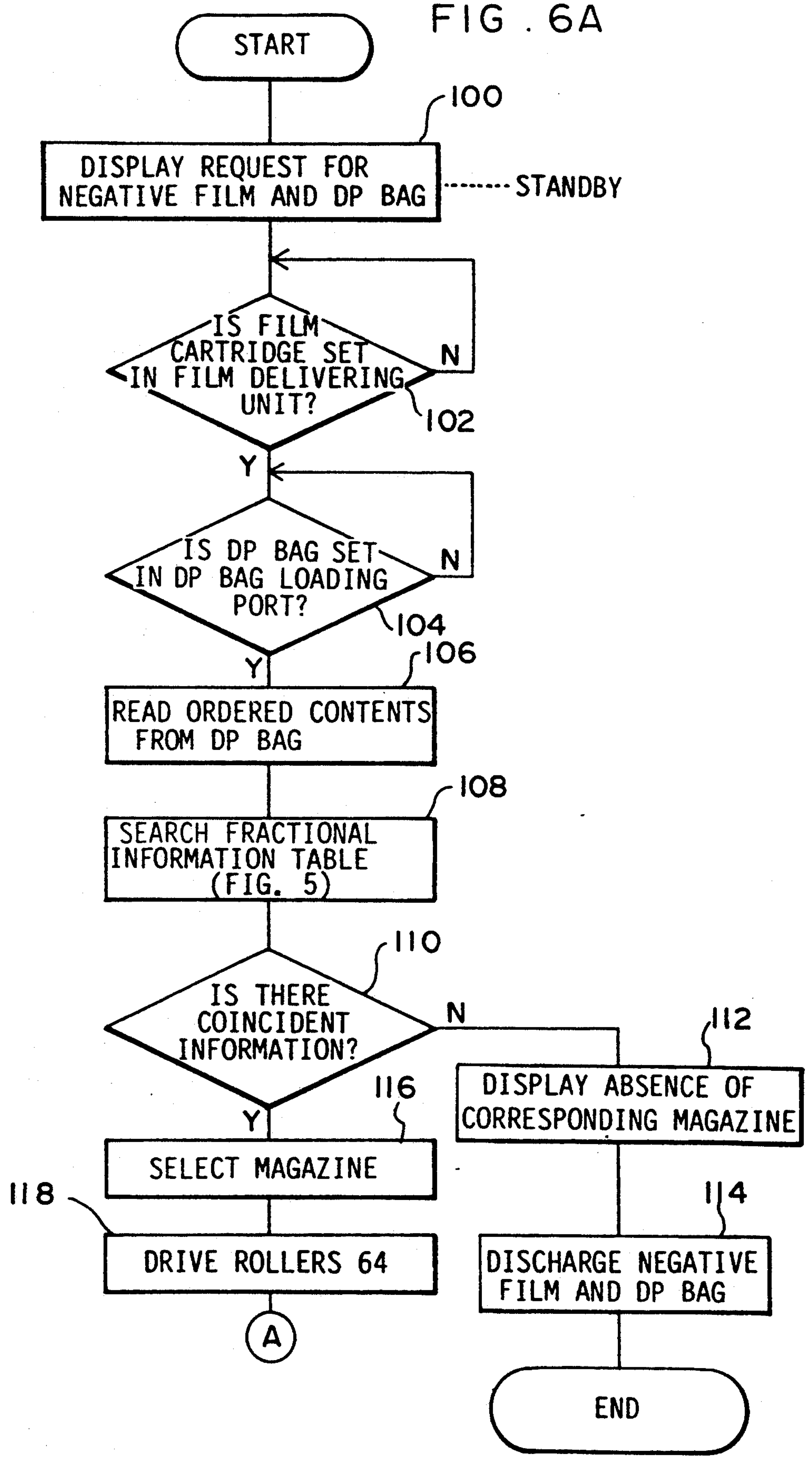
FIGS. 6A to 6C are flowcharts for describing a control procedure executed by the film splicing apparatus.
Figure 6B:
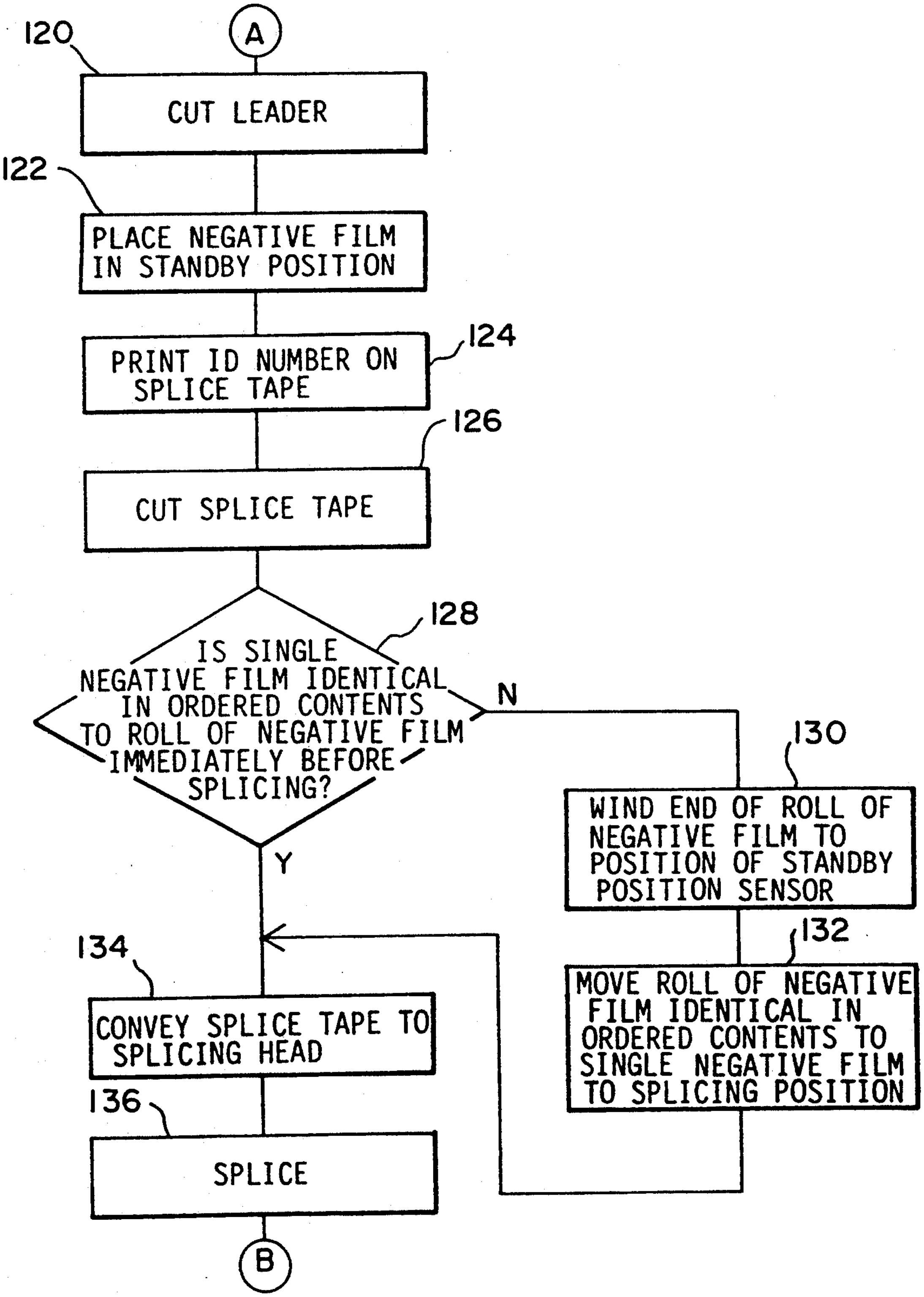
Figure 6C:
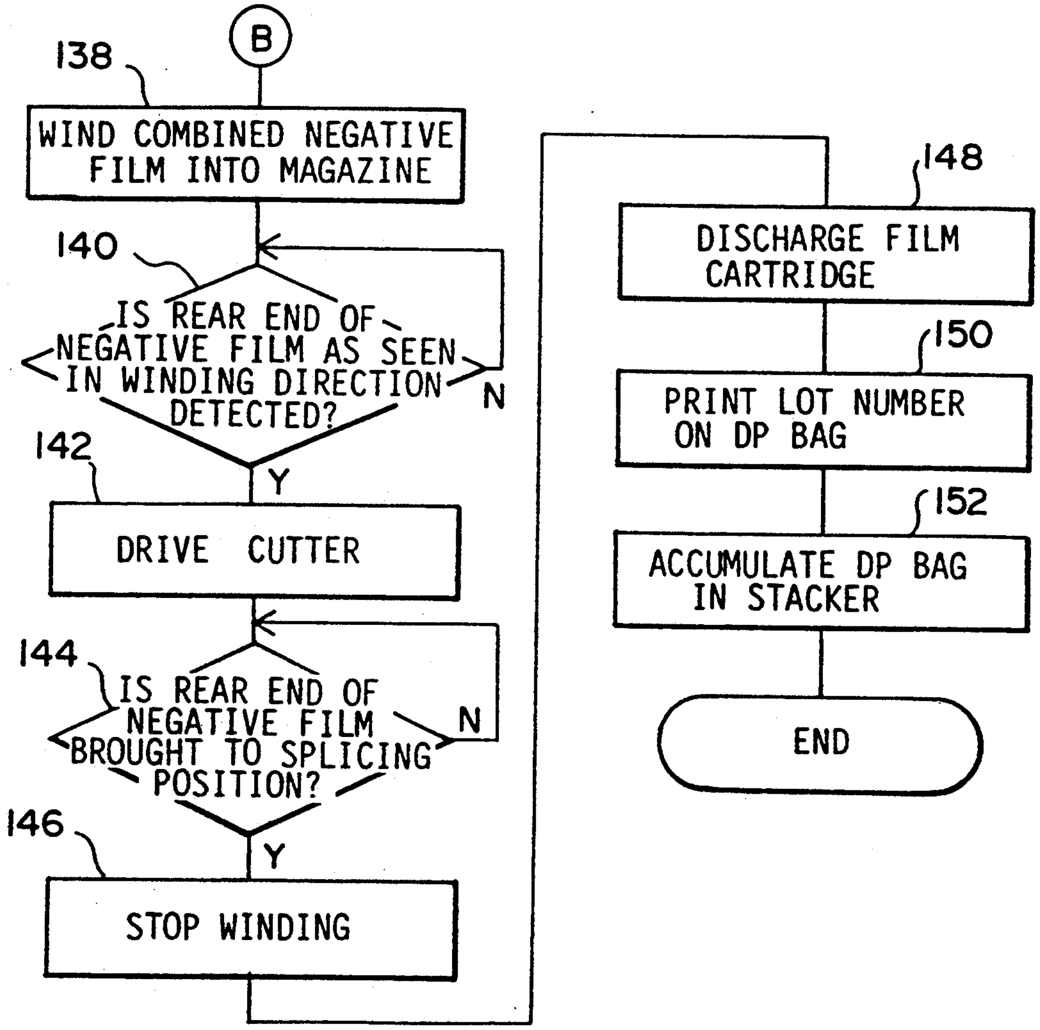

As shown in FIGS. 6A to 6C, in Step 100, a message requiring the setting of the negative film 56 and the envelope 28 is displayed on the operation/display unit 22 so as to represent a standby state.

In the next Step 102, it is determined whether or not the film cartridge 14 has been set in the film delivering unit 60 after it has been inserted through the loading portion 16. If the answer is determined to be Yes, then the routine proceeds to Step 104.

It is determined in Step 104 whether or not the envelope 28 having the negative film 56 (film cartridge 14) accommodated therein has been set in the envelope loading port 30. If the answer is determined to be Yes, then the pair of rollers 36 is activated to feed the envelope 28 into the envelope reader/printer unit 40.

In Step 106, the envelope reader/printer unit 40 reads the contents ordered, which have been recorded on the envelope 28. Next, in Step 108, sorting information corresponding to the read ordering instructions is searched from a predetermined sorting information table (see FIG. 5).

It is determined in Step 110 whether or not the ordering instructions read as result of its search have been retrieved from the sorting information table. If the answer is determined to be No, then the routine procedure proceeds to Step 112 where it is determined that a negative film having the same processing condition does not exist in the loaded magazines 54 because the ordering instructions are different from the predetermined information, and the result of the determination is displayed on the operation/display unit 22. Thereafter, the negative film 56 and the envelope 28 are discharged in Step 114.

If the answer is determined to be Yes in Step 110, then the routine proceeds to Step 116 where a desired magazine 54 is selected. Thereafter, the routine proceeds to Step 118 where the rollers 64 are activated to convey the negative film 56. In Step 120, a narrow leader formed on the leading end of the negative film 56 is cut by the cutter 74.

When the leading end of the negative film 56 is detected by the negative-film leading end sensor 70 in the next Step 122, the rollers 64 are inactivated so as to place the negative film 56 in a standby state at a splicing position.

In the next Step 124, an ID number is printed on a splice tape in the splice tape supplier 68. After the splice tape has been cut to a predetermined length in Step 126, the routine proceeds to Step 128.

It is determined in Step 128 whether or not the single negative film 56, which has been placed in the standby state in Step 122, is identical in the ordering instructions to a roll of negative film 56 joined to a single negative film 56 immediately before the present determination. If the answer is determined to be No, the routine proceeds to Step 130 where each of the rollers 78, 80, 82 is activated to wind the roll of negative film 56, located at the present splicing position, until the rear end of the negative film 56 extending in a direction in which the negative film 56 is wound into the corresponding magazine 54, is detected by each of the standby position sensors (90, 92, 94).

Then, the routine proceeds to Step 132. In Step 132, each of the rollers 78, 80, 82 is driven to pull the roll of negative film 56 identical in the ordering instructions to the single negative film 56 held in the standby position from the corresponding magazine 54 and to feed the same to the splicing position. Thereafter, the routine proceeds to Step 134.

If the answer is determined to be Yes in Step 128, it is then unnecessary to replace the roll of negative film 56 with another. Therefore, the routine procedure jumps over Steps 130, 132, followed by proceeding to Step 134.

In the next Step 134, a splice tape is fed to the splicing head 66. In Step 136, the splicing head 66 is activated to splice both the single negative film 56 and the roll of negative film 56 in such a manner that the splice tape sticks the two together.

In the next Step 138, the pair of rollers 64 is activated and the combined negative film 56 is wound into a magazine 54 corresponding to the roll of negative film 56 joined to the single negative film 56. It is now determined in Step 140 whether or not the rear end of the combined negative film 56 has been detected by the negative-film rear end sensor 72. If the answer is determined to be Yes, then the routine procedure proceeds to Step 142 where the cutter 74 is operated to separate the combined negative film 56 from the spool 58.

When the rear end of the separated negative film 56 is brought to the splicing position (Step 144), the winding of the negative film 56 into the magazine 54 is stopped (Step 146). The routine then proceeds to Step 148.

In Step 148, the empty film cartridge 14 is discharged. Then, in Step 150, a lot number corrsponding to an ID number printed on the splicing tape which was used to splice the single negative film 56 and the roll of negative film 56 together, is printed on the envelope 28. Then, the routine proceeds to Step 152 where the envelope 28 is accumulated in a given envelope stacker 52.

According to the present embodiment, a process for classifying and sorting negative films 56 for the same ordering instructions is automatically effected in the film splicing apparatus 10. A sorting process is therefore unnecessary and the efficiency of work is improved.

In the present embodiment as well, envelopes 28 are sorted simultaneously with the above film sorting and hence each negative film 56 can be associated with the envelope 28.

Figure 7:
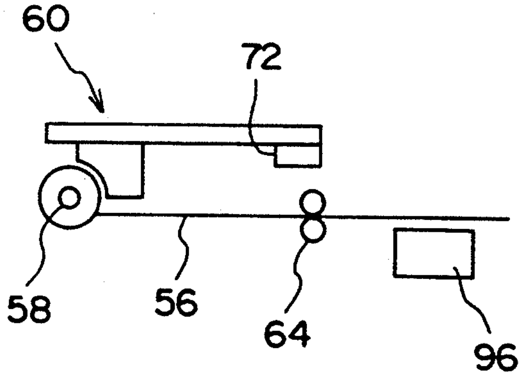
FIG. 7 is a schematic view showing a film delivering unit and a reading sensor of a film splicing apparatus according to another embodiment of the present invention.

In the present embodiment, the ordering instructions recorded on each envelope 28 are read and the negative films 56 are classified for the ordering instructions. It is however unnecessary to read the ordering instructions from the envelope 28 by previously recording ordering instructions on a negative film 56 as optical or magnetic information and providing a sensor 96 capable of reading the optical or magnetic information on the downstream side of the film delivering unit 60 as shown in FIG. 7.

Further, if information about a photographing frame size can be recorded by a camera employed in photography upon recording of the ordering instructions on each negative film 56, then the photographing frame size can be recognized before development and the negative films 56 can also be classified according to the frame sizes.

Thus, after the negative films 56 have first been spliced together at random and then developed, it is unnecessary to recut and resplice the negative films 56 for each frame size, thereby making it possible to improve the efficiency of work.

Having now fully described the invention, it will be apparent to those skilled in the art that many changes and modifications can be made without departing from the spirit or scope of the invention as set forth herein.

What is claimed is:

1. A film splicing apparatus for sorting a plurality of photographic films by ordering instructions of customers and for splicing the sorted photographic films together, comprising:

a plurality of magazines for accommodating respective first photographic films therein according to ordering instructions, said first photographic films each being a single photographic film or a plurality of spliced photographic films;

first conveying means for pulling a second exposed photographic film from a film cartridge so as to convey the same along a predetermined conveying path;

reading means for reading ordering instructions of said second photographic film;

selecting means for selecting a magazine corresponding to the ordering instructions which have been read by said reading means;

second conveying means for guiding and conveying an outermost peripheral winding rear end of a first photographic film accommodated in said selected magazine toward said predetermined conveying path;

splicing means for splicing together the leading end of said second photographic film placed in said conveying path and the rear end of said first photographic film; and winding means for winding said first photographic film joined to said second photographic film by said splicing means into said magazine.

2. A film splicing apparatus according to claim 1, wherein said ordering instructions include at least one of frame size employed in a photographic camera, enlargement size at the time of printing and the kind of surface of printing paper at the time of printing.

3. A film splicing apparatus according to claim 1, further including envelope sorting means for sorting envelopes for delivering photographic films between each user and a photofinisher according to said ordering instructions which have been read by said reading means.

4. A film splicing apparatus according to claim 1, wherein said ordering instructions to be read by said reading means, are recorded as code information in an order column applied to each of the envelopes for delivering the photographic films between each user and the photofinisher.

5. A film splicing apparatus according to claim 1, wherein said ordering instructions to be read by said reading means, are recorded as optical information on said second photographic film in advance.

6. A film splicing apparatus according to claim 1, wherein said ordering instructions to be read by said reading means, are recorded as magnetic information on said second photographic film in advance.

7. A film splicing apparatus according to claim 1, further including determining means for determining whether or not the ordering instructions of said second photographic film placed on said conveying path coincide with those of said first photographic film before the leading end of said second photographic film and the rear end of said first photographic film are spliced together.

8. A film splicing apparatus for sorting a plurality of photographic films by ordering instructions and splicing the sorted photographic films together, comprising:

a plurality of magazines for accommodating respective first photographic films therein according to ordering instructions, said first photographic films each being a single photographic film or a plurality of spliced photographic films;

first conveying means for pulling a second exposed photographic film from a film cartridge so as to convey the same along a predetermined conveying path;

stopping means for detecting the leading end of said second photographic film and for stopping the same at a splicing position;

reading means for reading ordering instructions of said second photographic film;

selecting means for selecting a magazine corresponding to the ordering instructions which have been read by said reading means;

determining means for determining whether or not the outermost peripheral winding rear end of a first photographic film accommodated in said selected magazine is located at said splicing position;

second conveying means for guiding and conveying the outermost peripheral winding rear end of said first photographic film accommodated in said selected magazine toward said splicing position;

splicing means for splicing together the leading end of said second photographic film and the rear end of said first photographic film at said splicing position; and winding and accommodating means for winding and accommodating said first photographic film joined to said second photographic film by said splicing means within said magazine;

third conveying means for conveying envelopes for delivering photographic films between each user and a photofinisher;

sorting means for sorting said envelopes according to ordering instructions which have been read by said reading means; and a plurality of stackers for accommodating the envelopes therein which were sorted by said sorting means, said stackers being identical in number to said magazines.

9. A film splicing apparatus according to claim 8, wherein said ordering instructions include at least one of frame size employed in a photographic camera, enlargement size at the time of printing and the kind of surface of printing paper at the time of printing.

10. A film splicing apparatus according to claim 8, wherein said ordering instructions to be read by said reading means, are recorded as code information in an order column applied to each of the envelopes.

11. A film splicing apparatus according to claim 8, wherein said ordering instructions to be read by said reading means, are recorded as optical information on said second photographic film in advance.

12. A film splicing apparatus according to claim 8, wherein said ordering instructions to be read by said reading means, are recorded as magnetic information on said second photographic film in advance.

13. A method of sorting a plurality of photographic films by ordering instructions of customers and splicing the sorted photographic films together, said method comprising the following steps:

a step (a) for reading ordering instructions relative to a second photographic film;

a step (b) for selecting a magazine for accommodating said second photographic film therein based on said ordering instructions read in said step (a), conveying the outermost peripheral winding rear end of a first photographic film which has been accommodated in said selected magazine, to a splicing position, and conveying the leading end of said second photographic film to said splicing position, said first photographic film being a single photographic film or being each of a plurality of spliced photographic films; and a step (c) for splicing together the leading end of said second photographic film and the rear end of said first photographic film at said splicing position.

14. A method according to claim 13, wherein said ordering instructions include at least one of frame size employed in a photographic camera, enlargement size at the time of printing and the kind of surface of printing paper at the time of printing.

15. A method according to claim 13, wherein said step (a) includes reading ordering instructions while conveying at least one of said second photographic film and an envelope for delivering photographic films between a user and a photofinisher.

16. A method according to claim 15, wherein said step (a) includes reading order information which has been recorded as code information in an order column applied to said envelope while said envelope is being conveyed.

17. A method according to claim 13, wherein said step (a) includes reading order information which has been previously recorded as ootical information on said second photographic film while said second photographic film is being conveyed.

18. A method according to claim 13, wherein said step (a) includes reading order information which has been previously recorded as magnetic information on said second photographic film while said second photographic film is being conveyed.

19. A method according to claim 13, further including, after said step (c), a step (d) for accommodating said first photographic film joined to said second photographic film in said magazine.

20. A method according to claim 13, further including, after said step (a), a step (e) for sorting envelopes for delivering photographic films between each user and a photofinisher according to the ordering instructions which have been read in said step (a).

* * * * *